(12) United States Patent
Endou

(10) Patent No.: US 12,429,850 B2
(45) Date of Patent: Sep. 30, 2025

(54) CONTROLLER, DATA TRANSFER SYSTEM OF CONTROLLER, AND DATA TRANSFER METHOD

(71) Applicant: FANUC CORPORATION, Yamanashi (JP)

(72) Inventor: Katsuhiro Endou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 576 days.

(21) Appl. No.: 17/913,155

(22) PCT Filed: Mar. 22, 2021

(86) PCT No.: PCT/JP2021/011745
§ 371 (c)(1),
(2) Date: Sep. 21, 2022

(87) PCT Pub. No.: WO2021/193549
PCT Pub. Date: Sep. 30, 2021

(65) Prior Publication Data
US 2023/0145173 A1    May 11, 2023

(30) Foreign Application Priority Data
Mar. 24, 2020 (JP) ................................. 2020-052411

(51) Int. Cl.
*G05B 19/4155* (2006.01)
(52) U.S. Cl.
CPC .............................. *G05B 19/4155* (2013.01); *G05B 2219/41112* (2013.01)

(58) Field of Classification Search
None
See application file for complete search history.

(56) References Cited

U.S. PATENT DOCUMENTS

| 4,586,027 | A | 4/1986 | Tsukiyama et al. |
| 6,430,634 | B1 | 8/2002 | Mito |
| 10,829,107 | B1* | 11/2020 | Lee ........................ B60W 10/10 |
| 2017/0179869 | A1* | 6/2017 | Sekiguchi ............... H02P 23/14 |

FOREIGN PATENT DOCUMENTS

| CN | 103543701 A | 1/2014 |
| CN | 105933722 A | 9/2016 |
| JP | S6035373 A | 2/1985 |
| JP | H3171203 A | 7/1991 |

(Continued)

OTHER PUBLICATIONS

International Search Report in PCT/JP2021/011745, mailed May 11, 2021, 3pp.

*Primary Examiner* — Howard Cortes
(74) *Attorney, Agent, or Firm* — HAUPTMAN HAM, LLP

(57) ABSTRACT

A numerical controller includes a main control unit configured to analyze a program and a motor control unit configured to control a motor. In the case where motor control data is transferred from the main control unit to the motor control unit via a serial bus, instead of transferring all pieces of the motor control data to each shaft one by one, when the motor control data repeats a specific pattern, the repetition pattern and the number of repetitions are transferred, and the repetition pattern is duplicated in the motor control unit.

7 Claims, 7 Drawing Sheets

(56) References Cited

FOREIGN PATENT DOCUMENTS

| | | |
|---|---|---|
| JP | H4175036 A | 6/1992 |
| JP | H637902 U | 5/1994 |
| JP | 2001160025 A | 6/2001 |
| JP | 2003189108 A | 7/2003 |
| WO | 9835296 A1 | 8/1998 |

* cited by examiner

PATTERN EXAMPLE OF MOTOR CONTROL DATA FOR EACH CONTROL CYCLE

MACHINING PROGRAM COMMAND ; G01 UΔ x WΔ z Ff ;

| TRANSFER ROUND | 1ST | 2ND | 3RD | 4TH | 5TH | 6TH | 7TH | 8TH | . . . | K-TH | TOTAL |
|---|---|---|---|---|---|---|---|---|---|---|---|
| X-AXIS | Δ Xta | Δ Xtb | Δ Xta | Δ Xtb | Δ Xta | Δ Xtb | Δ Xta | Δ Xtb | ~ | Δ Xtb | Δ Xt |
| Z-AXIS | Δ Zta | Δ Zta | Δ Zta | Δ Ztb | Δ Zta | Δ Zta | Δ Zta | Δ Ztb | ~ | Δ Ztb | Δ Zt | even# CONTROLLER, DATA TRANSFER SYSTEM OF CONTROLLER, AND DATA TRANSFER METHOD

RELATED APPLICATIONS

The present application is a National Phase of International Application No. PCT/JP2021/011745 filed Mar. 22, 2021, which claims priority to Japanese Patent Application No. 2020-052411, filed Mar. 24, 2020.

TECHNICAL FIELD

The invention relates to a controller to an industrial machine, a data transfer system of the controller, and a data transfer method.

BACKGROUND ART

A numerical controller is a device for controlling an industrial machine including a machine tool, generates a control signal according to a program, and operates a plurality of drivers in the industrial machine according to a preset procedure.

In recent industrial machines, the number of motors (the number of shafts) to be controlled has been increasing. Also, the amount of data processed by the numerical controller has been increasing. For example, a machine tool may have not only linear axes of X-axis, Y-axis, and Z-axis but also rotating axes such as A-axis and B-axis. Moreover, there is a machine tool that can perform simultaneous machining using a plurality of tools rather than only one tool. In addition, a motor is used to replace tools and move jigs. As described above, as the drivers in the industrial machine increase, the number of shafts to be controlled increases, and the amount of data processed by the numerical controller increases.

Normally, a numerical controller includes a main control unit and a plurality of motor control units. The main control unit analyzes an input program and generates a command pulse. The motor control units receive motor control data including at least one kind of data of a command pulse, a torque command, a current cycle, or a control mode (cutting mode/positioning mode) from the main control unit, and output the motor control data to an amplifier in a servomotor.

Note that the torque command, the current cycle, and the control mode (cutting mode/positioning mode) are parameters related to motor control. The parameters related to the motor control are generally designated as parameters set in a machining program or a non-volatile memory.

In the numerical controller, the motor control data created by the main control unit is transferred via the motor control units to each servo amplifier. The main control unit and the motor control units are connected by a serial bus. As the motor control data increases, the transfer load on this serial bus increases.

Patent Document 1 discloses "a bus controller wherein a serial bus is added to an internal unit and an external I/O unit, which are connected to a bus controller and requiring periodic data transfer, to reduce the amount of data traffic on a parallel bus, thereby improving performance".

Patent Document 1: WO 98/35296

SUMMARY OF THE INVENTION

Problem to be Solved by the Invention

In Patent Document 1, the serial bus is added in order to reduce the traffic amount of the bus. However, adding a new serial bus not only requires physical configuration changes, but also complicates bus traffic control. Therefore, in order to stabilize the bus traffic, the data transfer amount may be reduced.

In a field of numerical controllers, technology for reducing the data transmission amount is desired.

Means for Solving Problem

A controller, which is an aspect of the disclosure, is a controller for generating motor control data of an industrial machine, and controlling drivers in the industrial machine according to the motor control data, the controller including a control data holder configured to hold motor control data of the drivers for each driver in the industrial machine, a control amount calculator configured to obtain a control amount of the drivers for each control cycle, a control data generator configured to convert the control amount for each control cycle into motor control data including a command pulse and data containing at least one of a torque command, a current cycle, or a control mode (cutting mode or positioning mode), a repetition pattern determinator configured to determine presence or absence of a repetition pattern in the motor control data, a repetition pattern generator configured to calculate the number of repetitions of the repetition pattern, a pattern data transferor configured to transfer the repetition pattern to a control unit for the drivers, a pattern notificator configured to transfer information related to the repetition pattern including the number of repetitions to the control unit of the driver, and a pattern data generator configured to duplicate the repetition pattern the number of repetitions, and write the duplicated repetition pattern to the control data holder for each control cycle.

A data transfer system, which is an aspect of the disclosure, is a data transfer system for generating motor control data of an industrial machine, and controlling drivers in the industrial machine according to the motor control data, the data transfer system including a control data holder configured to hold motor control data of the drivers for each driver in the industrial machine, a control amount calculator configured to obtain a control amount of the drivers for each control cycle, a control data generator configured to convert the control amount for each control cycle into motor control data including a command pulse and data containing at least one of a torque command, a current cycle, or a control mode (cutting mode or positioning mode), a repetition pattern determinator configured to determine presence or absence of a repetition pattern in the motor control data, a pattern data transferor configured to transfer the repetition pattern to a control unit for the drivers, a pattern notificator configured to transfer information related to the repetition pattern including the number of repetitions to the control unit for the drivers, and a pattern data generator configured to duplicate the repetition pattern the number of repetitions, and write the duplicated repetition pattern to the motor control data holder for each control cycle.

A data transfer method, which is an aspect of the disclosure, is a data transfer method for transferring data from a main control unit for generating motor control data of an industrial machine to a control unit for controlling drivers in the industrial machine based on the motor control data, the data transfer method including calculating a control amount of the drivers for each control cycle, converting the control amount for each control cycle into motor control data including a command pulse and data containing at least one of a torque command, a current cycle, or a control mode (cutting mode or positioning mode), determining presence or absence of a repetition pattern in the motor control data, calculating the number of repetitions of the repetition pattern, transferring the repetition pattern to the control unit for the drivers, and duplicating the repetition pattern the number of repetitions to generate the motor control data.

Advantageous Effect of the Invention

According to an aspect of the invention, the data transmission amount may be reduced without changing an internal configuration of a controller.

DESCRIPTION OF EMBODIMENTS

Figure 1:
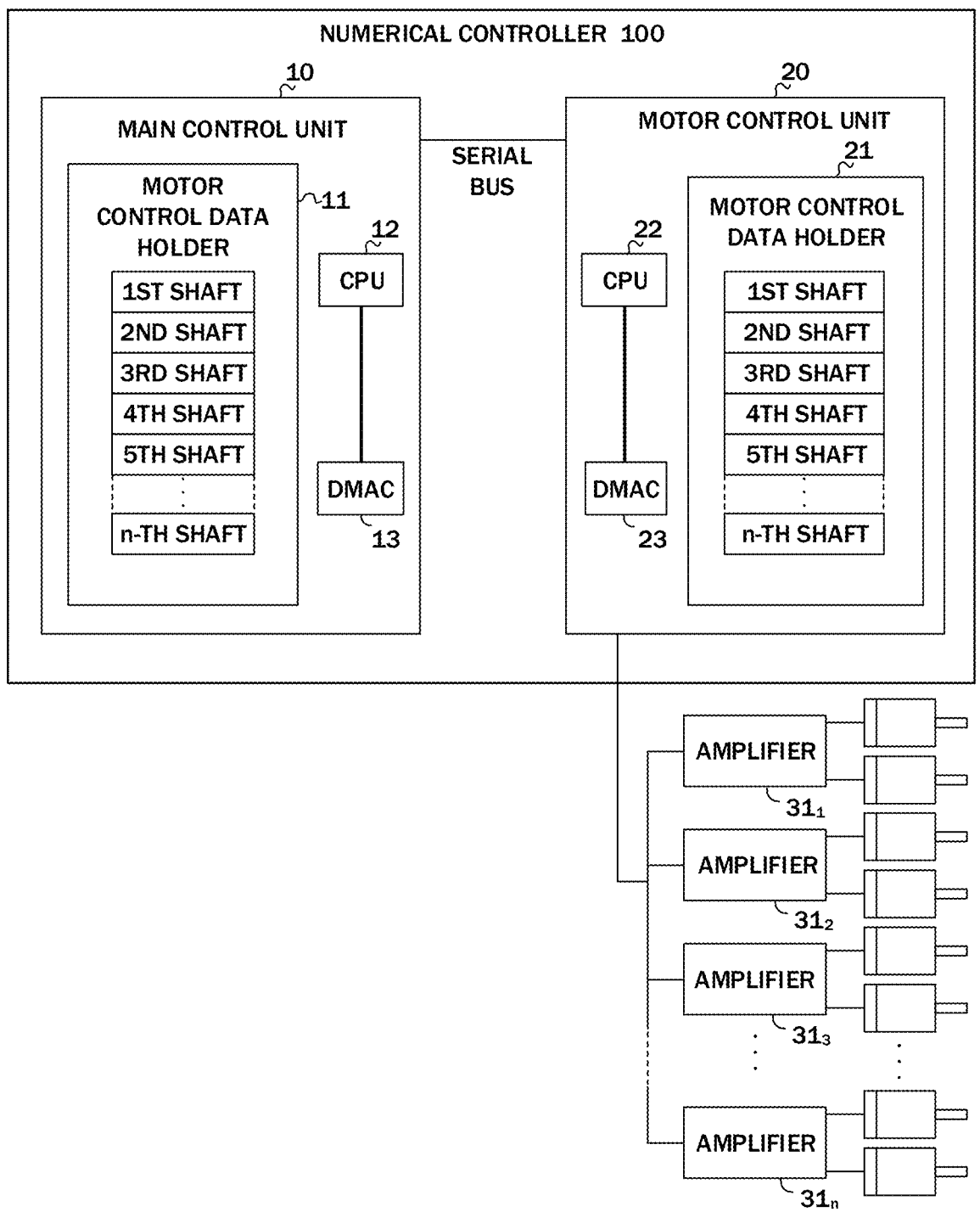
FIG. 1 is a hardware configuration of a numerical controller according to the present disclosure.

Hereinafter, a numerical controller 100 of the disclosure will be described. FIG. 1 is a hardware configuration of the numerical controller 100 according to the disclosure. The numerical controller 100 includes a main control unit 10 and a motor control unit 20. The main control unit 10 analyzes a machining program and creates motor control data. The motor control unit 20 controls a servo amplifier 31 according to the motor control data created by the main control unit 10.

Note that in FIG. 1, one motor control unit 20 is connected to one main control unit 10. However, there may be a plurality of motor control units 20.

The main control unit 10 includes a motor control data holder 11 configured to store motor control data, a CPU 12 configured to perform calculation and control according to a program held in a main memory, and a DMAC (direct memory access controller) 13 configured to control data transmission.

The motor control data holder 11 is a register for transferring motor control data on each shaft to the motor control unit 20. The DMAC 13 reads the motor control data from the motor control data holder 11 and transfers the data to the motor control unit 20 without passing through the CPU 12.

The motor control unit 20 includes a motor control data holder 21, a CPU 22, and a DMAC 23. The motor control data holder 21 is a register configured to temporarily hold data transferred from the main control unit 10. The DMAC 23 writes the data transferred from the main control unit 10 to the motor control data holder 21. The motor control unit 20 is connected to n servo amplifiers $31_1$ to $31_n$. A storage area of the motor control data holder 21 is associated with the servo amplifiers $31_1$ to $31_n$ of the first to n-th shafts. The motor control data is transferred at each control cycle. The numerical controller 100 performs real-time processing for processing the motor control data transferred at each control cycle without delay.

Figure 2A:
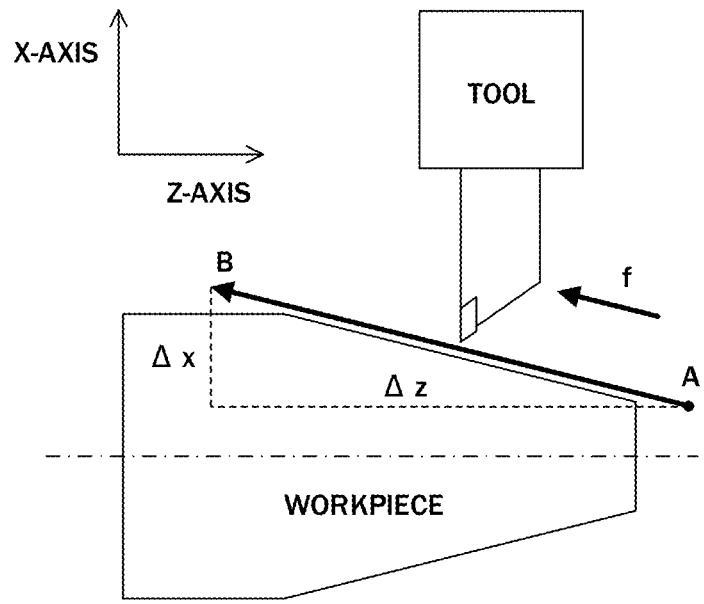
FIG. 2A is a diagram illustrating the case where a tool moves in an oblique direction with respect to a Z-axis on an X-Z plane.
Figure 2B:
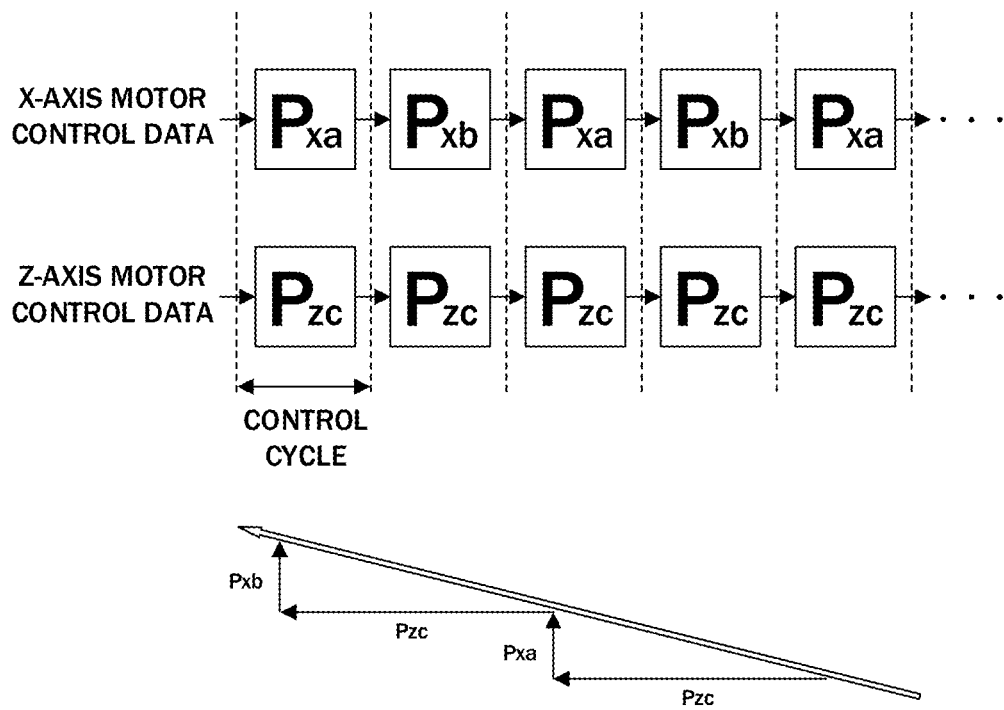
FIG. 2B is a diagram showing an example of a pattern of motor control data generated by a main control unit.

As illustrated in FIG. 2A, when a tool is moved in an oblique direction with respect to the Z-axis in an XZ-plane, motors for X-axis and Z-axis are driven at the same time. The motor control data is transferred from the main control unit 10 to the motor control unit 20 at each control cycle. FIG. 2B depicts an example of motor control data generated by the main control unit 10. In order to move the tool as illustrated in FIG. 2A, X-axis command pulses $P_{xa} \rightarrow P_{xb} \rightarrow P_{xa} \rightarrow P_{xb} \rightarrow$ . . . and Z-axis command pulses $P_{zc} \rightarrow P_{zc} \rightarrow P_{zc} \rightarrow P_{zc} \rightarrow$ . . . are generated, as shown in FIG. 2B. The motor control data is obtained by adding data including at least one of a torque command, a current cycle, or a control mode (cutting mode/positioning mode) to this command pulse.

The motor control data for X-axis is repetition of $P_{xa}$ and $P_{xb}$, and the motor control data for Z-axis is repetition of $P_{zc}$. In the numerical controller of the disclosure, when the motor control data has repetitions, the traffic amount between the main control unit 10 and the motor control unit 20 is reduced by transferring only the number of repetitions and a repetition pattern to the motor control unit 20.

The main control unit 10 and the motor control unit 20 are connected by a serial bus. The serial bus is a bus configured to continuously transfer data on one transmission line. Because there is only one transmission line, as the number of shafts controlled by the numerical controller 100 increases, the data amount of the motor control data and the traffic amount of the serial bus increase. Because control of the industrial machine is a real-time process that executes constantly changing data without delay, it is necessary to avoid delays due to data transfer. The numerical controller 100 of the disclosure prevents traffic delay by reducing the amount of data to be transferred.

[First Disclosure]

Figure 3:
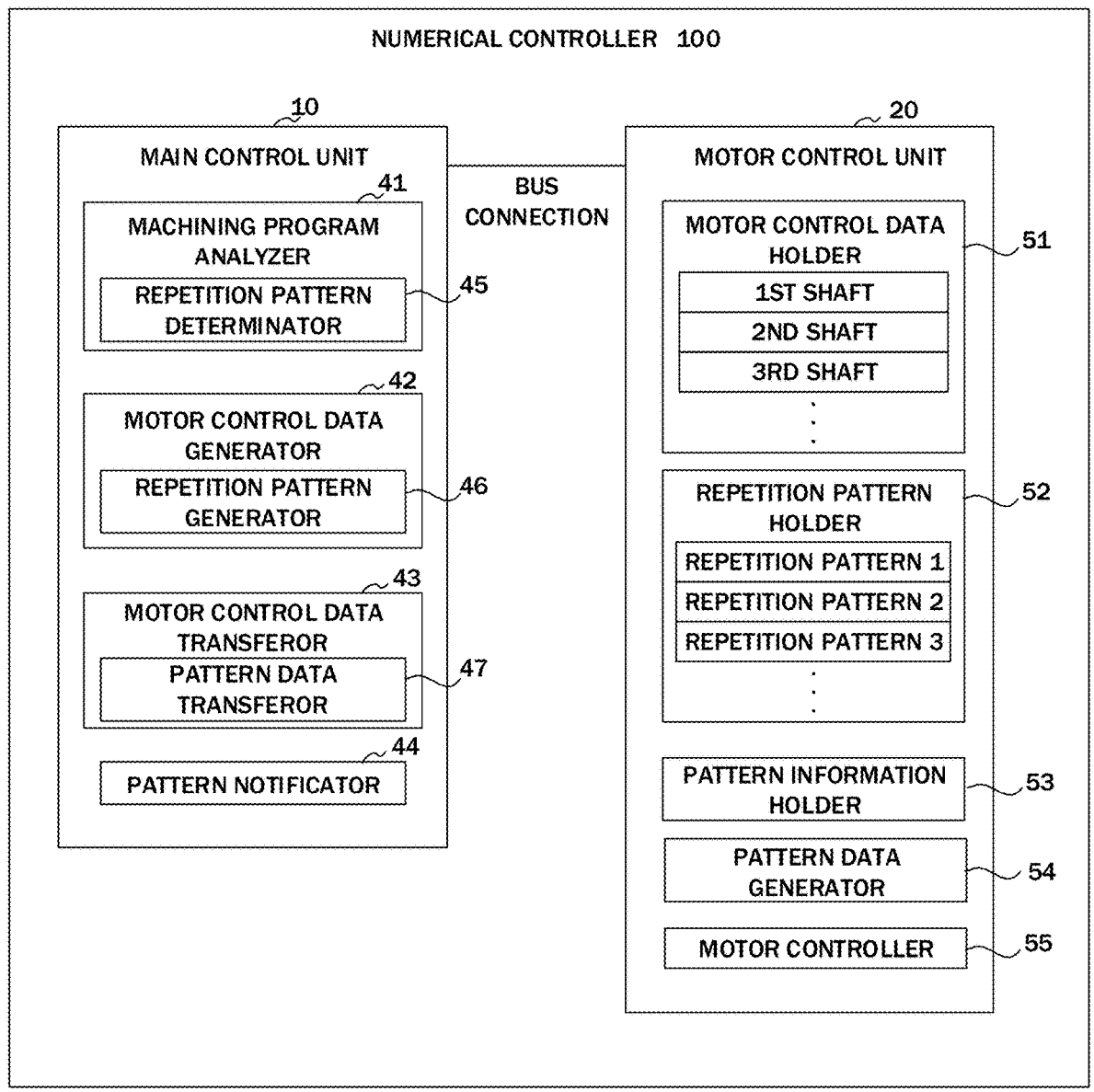
FIG. 3 is a block diagram of a numerical controller in a first disclosure.

FIG. 3 is a block diagram of a numerical controller 100 in a first disclosure. A main control unit 10 in the numerical controller 100 includes a machining program analyzer 41 configured to analyze a machining program, a motor control data generator 42 configured to generate motor control data, a motor control data transferor 43 configured to transfer the motor control data to a motor control unit 20, and a pattern notificator 44 configured to transfer information related to a repetition pattern.

The machining program analyzer 41 acquires a machining program recorded in a non-volatile memory, not shown, or the like and then analyzes a program for each block (one line) of the machining program to calculate the movement amount of each axis for each control cycle.

The motor control data generator 42 converts the movement amount for each control cycle calculated by the machining program analyzer 41 from a physical unit system such as meters or inches into an electric motor command unit using a pulse. Since the motor control data is an integral multiple of the minimum command unit, the motor control data generator 42 performs adjustment by average dispersion for each certain cycle so that the driver in the industrial machine smoothly moves.

The motor control data transferor 43 transfers the motor control data generated by the motor control data generator 42 to a motor control data holder 51 in the motor control unit 20. As illustrated in FIG. 1, the motor control data holder 51 may hold the motor control data of each shaft. The motor control data of each shaft is duplicated in a holding area of each shaft. The motor control data transferor 43 is embodied by the DMAC 13 and the CPU 12.

Above-mentioned functions are similar to those of the conventional numerical controller 100. The main control unit 10 of the disclosure further includes a repetition pattern determinator 45, a repetition pattern generator 46, a pattern data transferor 47, and a pattern notificator 44.

The repetition pattern determinator 45 determines whether or not a repetition pattern exists in the motor control data. The repetition pattern is made by a combination of a plurality of elements. In the case of FIG. 2B, a combination of the three elements $P_{xa}$, $P_{xb}$, and $P_{zc}$ forms the repetition pattern.

The repetition pattern generator 46 converts the detected repetition pattern element from a unit system of a physical length such as meters or inches into a motor command unit with an electric pulse.

The pattern data transferor 47 acquires pattern data from the repetition pattern generator 46 to transfer the pattern data from the main control unit 10 to a memory in the motor control unit 20 at each control cycle. The pattern data transferor 47 identifies repetition pattern data, for example, by using an address of the repetition pattern data or the like. That is, the pattern data transferor recognizes which address of the repetition pattern holder 52 holds the repetition pattern data for which pattern on which axis.

The pattern notificator 44 transfers identification information of the repetition pattern and information on the number of repetitions to the motor control unit 20. The motor control unit 20 duplicates a repetition pattern to the register for the corresponding shaft on the basis of the number of repetitions and the repetition pattern acquired from the pattern notificator 44, and generates motor control data.

Next, a configuration of the motor control unit 20 will be described. The motor control unit 20 includes the motor control data holder 51 configured to hold motor control data, a repetition pattern holder 52 configured to hold a repetition pattern, a pattern information holder 53 configured to hold information related to a repetition pattern, a repetition pattern data generator 54 configured to generate motor control data from a repetition pattern, and a motor controller 55 configured to control a servomotor using the motor control data held in the motor control data holder 51.

The motor control data holder 51, the repetition pattern holder 52, and the pattern information holder 53 are, for example, configured as a shared memory with the main control unit 10. There is a correspondence between addresses of the shared memory of the main control unit 10 and the motor control unit 20. The main control unit 10 and the motor control unit 20 mutually recognize what data are held in which area for the other unit in the memory. That is, the addresses of the shared memory function as data identification information.

The motor control data holder 51 holds the motor control data used by the motor controller 55 to control the servo amplifier 31. As illustrated in FIG. 1, the motor control data are held for each shaft in the industrial machine. The motor controller 55 outputs a control signal to the servo amplifier 31 based on the motor control data held in the motor control data holder 51.

The repetition pattern holder 52 holds the repetition pattern generated by the repetition pattern generator 46.

The pattern information holder 53 holds data related to repetition such as the identification information of the repetition pattern, the number of repetitions, and identification information of a shaft performing repetition, which are transferred from the pattern notificator 44.

The pattern data generator 54 acquires the repetition pattern from the repetition pattern holder 52 based on the information held in the pattern information holder 53 to write the repetition pattern in a storage area of the corresponding shaft in the motor control data holder 51.

The motor controller 55 reads the motor control data according to a control cycle and outputs the read motor control data to the servo amplifier 31 for each motor. The servo amplifier 31 controls the rotation speed and torque of the motor according to the motor control data.

As described above, in the numerical controller 100 of the disclosure, instead of transferring all pieces of motor control data of each shaft one by one, when the motor control data repeats a specific pattern, information on the repetition pattern and the number of repetitions is transferred to reduce the amount of data to be transferred to the motor control unit.

When the amount of transfer data becomes less, the transfer load of the serial bus becomes less, thereby preventing transfer delay. In addition, a usage rate of hardware resources, such as the CPU and the DMAC, is reduced. It is thus possible to reduce the amount of heat generated.

[Second Disclosure]

Next, a second disclosure will be described.

Figure 4:
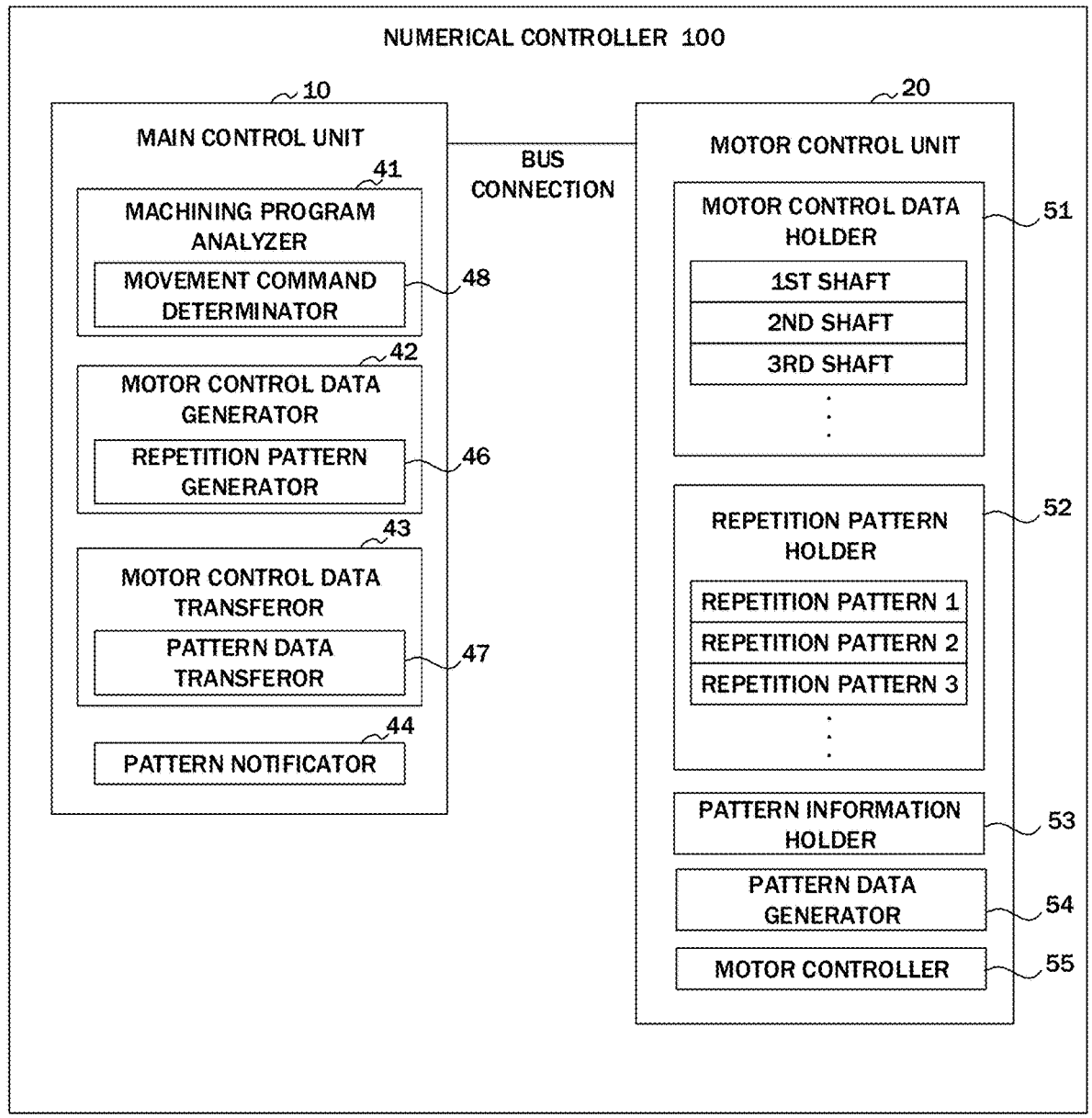
FIG. 4 is a block diagram of a numerical controller in a second disclosure.

FIG. 4 is a block diagram of a numerical controller 100 in the second disclosure, which includes a movement command determinator 48 configured to serve as the repetition pattern determinator 45 illustrated in FIG. 3.

The movement command determinator 48 detects whether or not a repetition pattern is present based on a command of a program. For example, since the repetitive pattern is generated in linear movement, when commands such as G01 (cutting feed command), G00 (rapid traverse command), and G53 (machine coordinate command) are described in the program, the movement command determinator 48 determines that the repetition pattern is generated.

The numerical controller 100 starts an iterative process based on a determination result of the movement command determinator 48. Note that detection of the repetition pattern using the program is an example. The presence or absence of the repetition pattern may be detected using another method.

Figure 5:
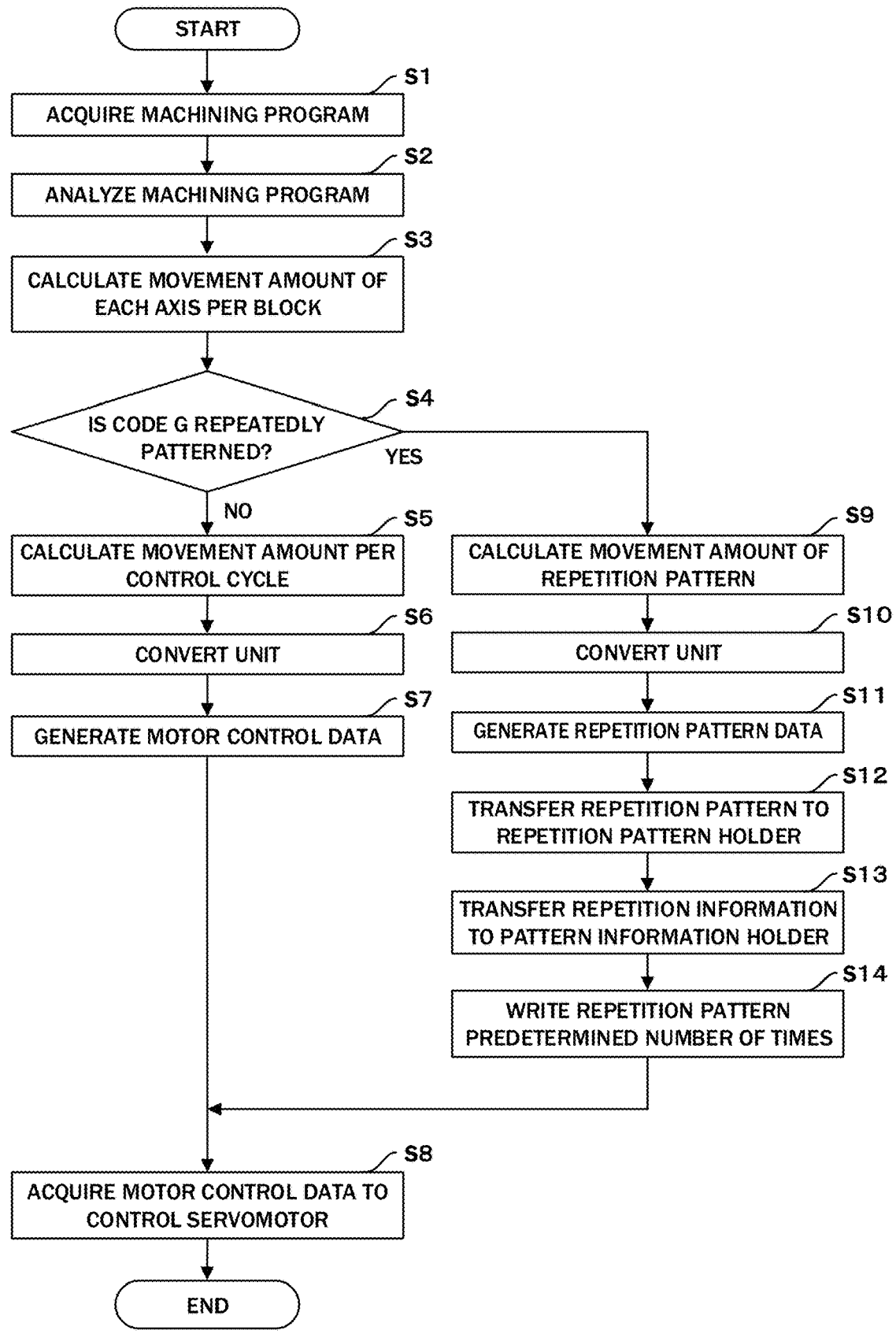
FIG. 5 is a flowchart illustrating a data transfer method in the second disclosure.

A data transfer method in the second disclosure will be described with reference to FIG. 5. In the second disclosure, the presence or absence of the repetition pattern is determined from a command described in a program. After determining that the repetition pattern is present, the data transfer method of the disclosure is started. With regard to the data transfer method, the first disclosure and the second disclosure perform the similar processing.

First, the machining program analyzer 41 acquires a machining program from a non-volatile memory, not shown (step S1). Next, the machining program analyzer 41 analyzes the machining program for each block (one line) (step S2). The machining program analyzer 41 calculates the movement amount of each axis per block (step S3).

The movement command determinator 48 determines whether or not code G described in the program is code G of the repetition pattern. Here, when the code G is not code G in the repetition pattern (step S4; NO), the movement amount of each axis per control cycle is calculated (step S5), a unit in meter or inch is converted into the motor command unit (step S6). Moreover, motor control data including at least one of a torque command, a current cycle, and a control mode (cutting mode/positioning mode) is generated (step S7).

The motor control data transferor 43 transfers the motor control data for each control cycle to the motor control data holder 51. The motor controller 55 acquires the motor control data from the motor control data holder 51 to control the servo amplifier 31 (step S8).

In step S4, when the code G is code G in the repetition pattern (step S4; YES), the repetition pattern generator 46 calculates the movement amount of an element included in the repetition pattern for each control cycle, data including at least one of a torque command, a current cycle, and a control mode (cutting mode/positioning mode), and the number of repetitions (step S9), converts the unit in meter or inch of the movement amount into the motor command unit (step S10), and generates repetition pattern data (step S11).

The pattern data transferor 47 transfers the repetition pattern to the repetition pattern holder 52 (step S12). The pattern notificator 44 transfers information related to repetition such as the repetition pattern to be used, the number of repetitions, and an axis to the pattern information holder 53 (step S13).

The pattern data generator 54 acquires information related to repetition from the pattern information holder 53, and writes a repetition pattern a predetermined number of times in the motor control data holder 51 for the corresponding shaft (step S14). The motor controller 55 acquires the motor control data from the motor control data holder 51, and controls the servo amplifier 31 (step S8).

Specific Example of Disclosure

Figures 6, 7:
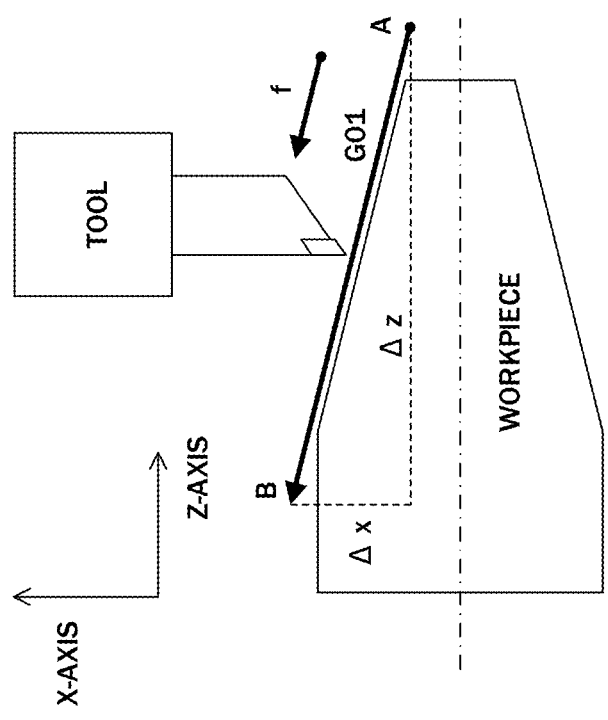
FIG. 6 is a diagram illustrating linear movement of a tool according to a two-axis command of X and Z axes.
FIG. 7 is a diagram illustrating the movement amount of each axis for each control cycle.

An operation of the numerical controller 100 will be described with reference to an example when the tool is linearly moved by a two-axis command of X and Z-axes. When block "G01 UΔx WΔz Ef" is described in a machining program, the tool is moved from point A to point B at a speed f as illustrated in FIG. 6. The movement amount of the tool in an X-axis direction is Δx, and the movement amount thereof in the Z-axis direction is Δz.

In this instance, the machining program analyzer 41 calculates the number of data transfers K (times) by the following equation on the basis of a movement vector AB from point A to point B (the movement amount of each axis), a feed rate f, and a control cycle (transfer cycle) T.

$$K = \frac{AB}{f \times T} \quad \text{[Equation 1]}$$

Next, the machining program analyzer 41 calculates the movement amount of each axis for each control cycle of the motor control data from the following equation.

Movement amount of X-axis for each control cycle: $\Delta X_t = \frac{\Delta x}{K}$ [Equation 2]

Movement amount of Z-axis for each control cylce: $\Delta Z_t = \frac{\Delta z}{K}$ The machining program analyzer 41 converts the movement amount of each axis for each control cycle into an integer in the unit of a minimum movement command, and performs adjustment so that a movement command for each transfer cycle becomes an average. As a result, each shaft moves smoothly. Specifically, when the movement amount Δx in the X-axis direction is divided by the number of transfers K, the movement amount may be indivisible, and a remainder is generated. The remainder is adjusted so as to be evenly distributed with respect to the number of transfers K. By decomposing the remainder, a repetition pattern in which the remainder is adjusted at regular intervals is obtained.

The number of repetitions may be calculated by "K/number of elements of repetition pattern". For example, when the movement amount of each axis for each control cycle changes as illustrated in FIG. 7, the movement amount of the X-axis for each control cycle repeats "ΔXta→ΔXtb" K/2 times, and the movement amount of the Z-axis for each control cycle repeats "ΔZta→ΔZta→ΔZta→ΔZtb" K/4 times.

Next, the motor control data generator 42 multiplies the movement amount of each axis generated by the machining program analyzer 41 by a coefficient (command coefficient or feedback coefficient) to convert the unit in inch or meter into the motor command unit. Data obtained by adding at least one of the torque command, the current cycle, and the control mode (cutting mode/positioning mode) thereto corresponds to the motor control data. Equations for unit conversion are as follows. Here, C denotes a command coefficient, and 1/D denotes a feedback coefficient.

$$X\text{-axis motor control data: } X_p = \Delta X_t \times \frac{C}{D} \quad \text{[Equation 3]}$$

$$Z\text{-axis motor control data: } Z_p = \Delta Z_t \times \frac{C}{D}$$

Note that, when normal motor control data is generated, it is necessary to perform unit conversion operations on all the data. However, in the case where the repetition pattern is used, when the repetition pattern is converted once, it is unnecessary to perform a unit conversion operation on the other data. The repetition pattern generator 46 performs a unit conversion operation only once for the repetition pattern repeated a plurality of times.

The following equations illustrate examples in which a unit conversion is performed on elements (Xa, Xb) included in an X-axis repetition pattern and another unit conversion is performed on elements (Za, Zb) included in a Z-axis repetition pattern to calculate the number of repetitions.

$$X\text{-axis motor control data: } X_{pa} = \Delta X_{pa} \times \frac{C}{D}, \quad \text{[Equation 4]}$$

$$X_{pb} = \Delta X_{pb} \times \frac{C}{D}$$

X-axis repitition pattern: K/2 times $$Z\text{-axis motor control data: } Z_{pa} = \Delta Z_{pa} \times \frac{C}{D}, Z_{pb} = \Delta Z_{pb} \times \frac{C}{D}$$

Z-axis repitition pattern: K/4 times

The motor control data transferor 43 transfers the motor control data from the main control unit 10 to the motor control unit 20 at each control cycle T. When the motor control data to be transferred is normal motor control data, all the motor control data generated by the motor control data generator 42 is transferred to the motor control data holder 51 at each control cycle. On the contrary, when the motor control data to be transferred is a repetition pattern, the motor control data generated by the motor control data generator 42 is transferred to the motor control data holder 51 at least once. However, thereafter, the repetition pattern is duplicated.

The repetition pattern that is a basis of duplication is transferred by the pattern data transferor 47 to the repetition pattern holder 52.

The pattern data generator 54 in the motor control unit 20 reads the repetition pattern stored in the repetition pattern holder 52, and duplicates the read repetition pattern in the motor control data holder 51 a predetermined number of times.

Note that, even though the above-mentioned example corresponds to a repetition pattern of the tool that moves at a constant speed, it is possible to generate a repetition pattern thereof in the case of acceleration or deceleration. In this case, an incremental pattern or a decremental pattern according to acceleration or deceleration is created, and a reference repetition pattern is then added.

[Third Disclosure]

Figure 8:
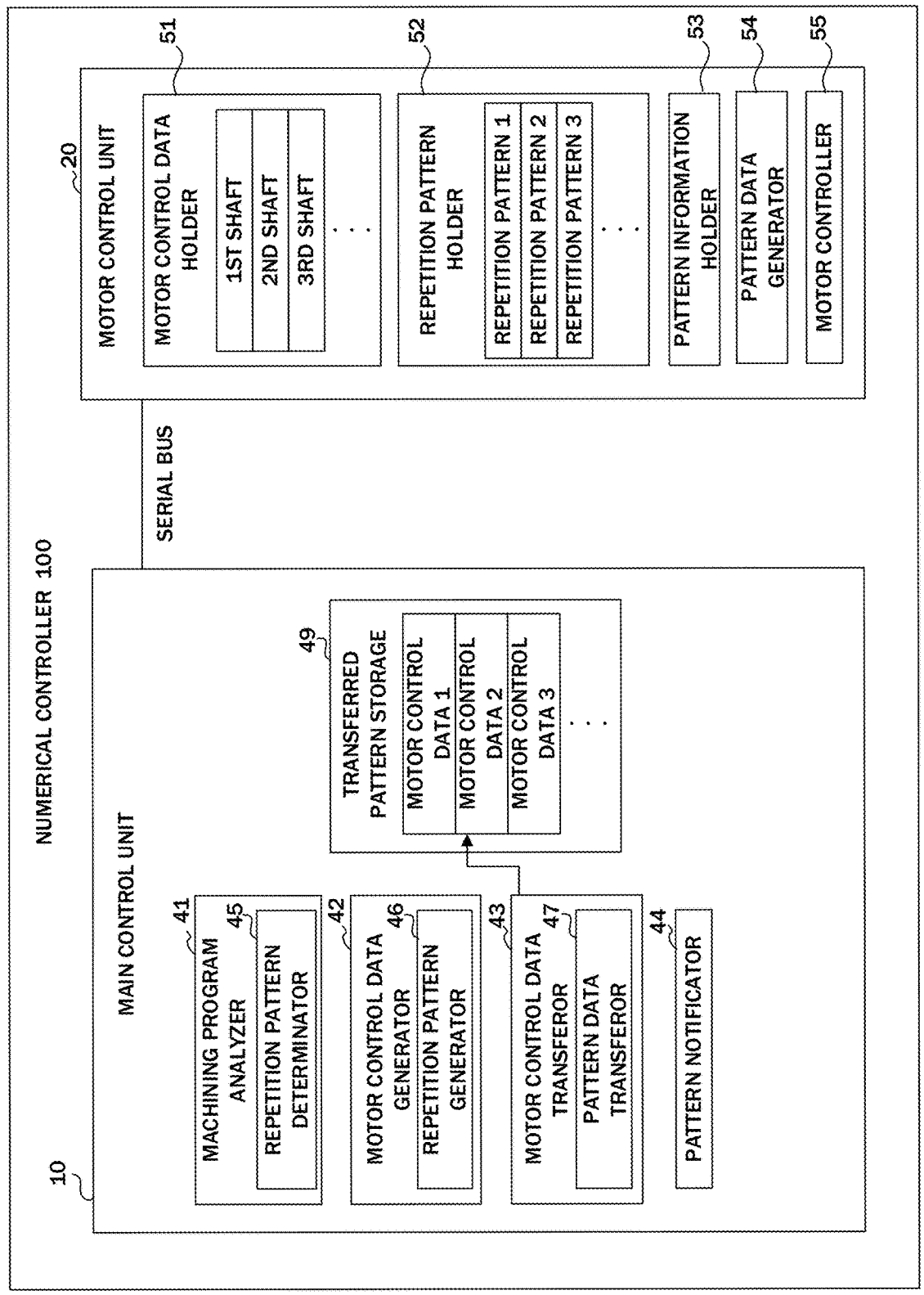
FIG. 8 is a block diagram of a numerical controller in a third disclosure.

FIG. 8 is a block diagram of a numerical controller 100 in a third disclosure. The numerical controller 100 of FIG. 8 is provided with a transferred pattern storage 49 in a main control unit 10. The pattern data transferor 47 verifies whether or not a repetition pattern to be transferred has been transferred, and transfers only other data such as the number of repetitions when the repetition pattern has been transferred. In the third disclosure, the data transfer amount may be further reduced by reducing the number of times that the repetition pattern is transferred.

Even though one embodiment has been described above, the invention is not limited only to the above-mentioned disclosure, and may be implemented in various embodiments by making appropriate changes.

EXPLANATIONS OF LETTERS OR NUMERALS

100 NUMERICAL CONTROLLER
10 MAIN CONTROL UNIT
11 MOTOR CONTROL DATA HOLDER
12 CPU
13 DMAC
20 MOTOR CONTROL UNIT
21 MOTOR CONTROL DATA HOLDER
22 CPU
23 DMAC
31 SERVO AMPLIFIER
41 MACHINING PROGRAM ANALYZER
42 MOTOR CONTROL DATA GENERATOR
43 MOTOR CONTROL DATA TRANSFEROR
44 PATTERN NOTIFICATOR
45 REPETITION PATTERN DETERMINATOR
46 REPETITION PATTERN GENERATOR
47 PATTERN DATA TRANSFEROR
48 MOVEMENT COMMAND DETERMINATOR
49 TRANSFERRED PATTERN STORAGE
51 MOTOR CONTROL DATA HOLDER
52 REPETITION PATTERN HOLDER
53 PATTERN INFORMATION HOLDER
54 PATTERN DATA GENERATOR
55 MOTOR CONTROLLER

The invention claimed is:

1. A controller for generating motor control data of an industrial machine, and controlling drivers in the industrial machine according to the motor control data, the controller comprising:
   a control data holder configured to hold motor control data of the drivers for each driver in the industrial machine;
   a control amount calculator configured to obtain a control amount of the drivers for each control cycle;
   a control data generator configured to convert the control amount for each control cycle into motor control data including a command pulse and data containing at least one of a torque command, a current cycle, or a control mode;
   a repetition pattern determinator configured to determine presence of a repetition pattern in the motor control data;
   a repetition pattern generator configured to calculate the number of repetitions of the repetition pattern;
   a pattern data transferor configured to transfer the repetition pattern to a control unit for the drivers;
   a pattern notificator configured to transfer information related to the repetition pattern including the number of repetitions to the control unit for the drivers; and
   a pattern data generator configured to duplicate the repetition pattern the number of repetitions, and write the duplicated repetition pattern to the control data holder for each control cycle.

2. The controller according to claim 1, comprising:
   a program analyzer configured to analyze a program; and
   a movement command determinator configured to detect presence or absence of a repetition pattern based on a command described in the program.

3. The controller according to claim 2, wherein, when the movement command determinator detects presence of a repetition pattern, the controller starts operations of the repetition pattern generator, the pattern data transferor, the pattern notificator, and the pattern data generator.

4. The controller according to claim 1, comprising a transferred pattern data storage configured to store a transferred repetition pattern,
   wherein the pattern data transferor exclusively transfers a repetition pattern not transferred in a past.

5. The controller according to claim 1, wherein the pattern data transferor transfers the repetition pattern using a serial bus.

6. A data transfer system for generating motor control data of an industrial machine, and controlling drivers in the industrial machine according to the motor control data, the data transfer system comprising:
   a control data holder configured to hold motor control data of the drivers for each driver in the industrial machine;
   a control amount calculator configured to obtain a control amount of the drivers for each control cycle;
   a motor control data generator configured to convert the control amount for each control cycle into motor control data including a command pulse and data containing at least one of a torque command, a current cycle, or a control mode;
   a repetition pattern determinator configured to determine presence of a repetition pattern in the motor control data;
   a pattern data transferor configured to transfer the repetition pattern to a control unit for the drivers;

a pattern notificator configured to transfer information related to the repetition pattern including the number of repetitions to the control unit for the driver; and a pattern data generator configured to duplicate the repetition pattern the number of repetitions, and write the duplicated repetition pattern to the control data holder for each control cycle.

7. A data transfer method for transferring data from a main control unit for generating motor control data of an industrial machine to a control unit for controlling drivers in the industrial machine based on the motor control data, the data transfer method comprising:

calculating a control amount of the drivers for each control cycle;

converting the control amount for each control cycle into motor control data including a command pulse and data containing at least one of a torque command, a current cycle, or a control mode;

determining presence of a repetition pattern in the motor control data;

calculating the number of repetitions of the repetition pattern;

transferring the repetition pattern to the control unit for the drivers; and duplicating the repetition pattern the number of repetitions to generate the motor control data.

* * * * *